(12) United States Patent
Yu

(10) Patent No.: US 8,060,669 B2
(45) Date of Patent: Nov. 15, 2011

(54) MEMORY CONTROLLER WITH AUTOMATIC COMMAND PROCESSING UNIT AND MEMORY SYSTEM INCLUDING THE SAME

(75) Inventor: Bum-Seok Yu, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 154 days.

(21) Appl. No.: 11/692,482

(22) Filed: Mar. 28, 2007

(65) Prior Publication Data

US 2008/0162788 A1 Jul. 3, 2008

(30) Foreign Application Priority Data

Dec. 27, 2006 (KR) .................. 10-2006-0135294

(51) Int. Cl.
G06F 3/00 (2006.01)
G06F 5/00 (2006.01)
G06F 12/00 (2006.01)
G06F 13/00 (2006.01)
G06F 13/28 (2006.01)
G11C 7/10 (2006.01)

(52) U.S. Cl. .................. 710/52; 365/189.05; 711/118

(58) Field of Classification Search .................. 710/52; 365/189.05; 711/118
See application file for complete search history.

(56) References Cited

U.S. PATENT DOCUMENTS

| 4,703,475 A * | 10/1987 | Dretzka et al. ............. 370/394 |
| 5,590,122 A * | 12/1996 | Sandorfi et al. ............ 370/394 |
| 5,666,514 A * | 9/1997 | Cheriton ................ 711/144 |
| 5,778,426 A * | 7/1998 | DeKoning et al. ......... 711/122 |
| 6,480,936 B1 * | 11/2002 | Ban et al. ............... 711/118 |
| 6,684,312 B1 * | 1/2004 | Murayama et al. ......... 711/170 |
| 6,870,766 B2 | 3/2005 | Cho et al. |
| 6,914,013 B2 | 7/2005 | Chung |
| 7,042,770 B2 | 5/2006 | Lee et al. |
| 7,061,812 B2 | 6/2006 | Shinagawa et al. |
| 7,099,196 B2 | 8/2006 | Su et al. |
| 2002/0169932 A1 * | 11/2002 | Burns et al. ............. 711/154 |
| 2004/0202024 A1 * | 10/2004 | Shinagawa et al. ....... 365/185.29 |
| 2005/0132127 A1 * | 6/2005 | Chung et al. ............ 711/103 |
| 2006/0064537 A1 | 3/2006 | Oshima |
| 2008/0154961 A1 * | 6/2008 | Dougall ................. 707/104.1 |

FOREIGN PATENT DOCUMENTS

| JP | 05-257609 | 10/1993 |
| JP | 09-274599 | 10/1997 |
| JP | 2002-149479 | 5/2002 |
| JP | 2004-310477 | 11/2004 |
| JP | 2006-092019 | 4/2006 |
| JP | 08-212133 | 8/2006 |
| KR | 100263524 B1 | 5/2000 |
| KR | 1020040087916 A | 10/2004 |
| KR | 1020060051314 A | 5/2006 |
| WO | WO 2004114298 A2 * | 12/2004 |

* cited by examiner

*Primary Examiner* — Alford Kindred
*Assistant Examiner* — Farley Abad
(74) *Attorney, Agent, or Firm* — Myers Bigel Sibley & Sajovec

(57) ABSTRACT

Provided is a memory controller configured to control a flash memory device. The memory controller includes: a buffer memory configured to store data to be written in the flash memory device; a buffer memory interface configured to control read and write operations of the buffer memory; and an automatic command processing unit configured to interpret a data command generated by a host hardware device.

16 Claims, 3 Drawing Sheets

Fig. 3

| LA | PA |
|---|---|
| LA0 | PA3 |
| LA1 | PA4 |
| LA2 | PA0 |
| ⋮ | ⋮ |

Fig. 4

| | LA | PA | CNT |
|---|---|---|---|
| CMD0 | 0 | 0 | 50 |
| CMD2 | 50 | 50 | 100 |
| ⋮ | ⋮ | ⋮ | ⋮ |
| CMD1 | 500 | 1000 | 10 |
| ⋮ | ⋮ | ⋮ | ⋮ |

MEMORY CONTROLLER WITH AUTOMATIC COMMAND PROCESSING UNIT AND MEMORY SYSTEM INCLUDING THE SAME

CROSS-REFERENCE TO RELATED APPLICATIONS

This U.S. non-provisionial patent application claims priority under 35 U.S.C. §119 of Korean Patent Application No. 2006-135294, filed on Dec. 27, 2006, the entire contents of which are hereby incorporated by reference.

BACKGROUND OF THE INVENTION

The present invention relates to a memory devices, and more particularly, to memory controllers and systems.

Semiconductor memory devices may include random access memory (RAM) that can freely read/write data but may lose stored data when power is cut off, a read only memory (ROM) that may not lose data once programmed and may retain the data even if power is cut off, and flash memory devices that may include factors of both RAM and ROM. A card type package of a flash memory device may be called a memory card (or a flash memory card). The memory card has come into wide use as a recording medium for digital devices such as digital cameras and/or portable music players. Also, USB memory, which may include a flash memory device packaged with a USB connector, may be perceived as a convenient data exchange medium for personal computers (PC) because it may present a preferable alternative to floppy disks. Recently, some systems have a flash memory device mounted on a mother board of a PC for use as a BIOS memory.

Flash memory cards have been used as auxiliary data storage devices in earlier systems where slow reading and writing rates of 10 MB/s or less were sufficient. However, as demands for mass-storage increase, flash memory cards ideally include a fast access rate for large-capacity data management and can perform good enough to substitute for an existing hard disk. Therefore, a buffer memory, such as an SRAM or a DRAM, may be needed. A buffer memory may have a capacity several times greater than that of a buffer memory used in early flash memory cards. However, additional software may be needed to manage the increasing capacity. In general, even a flash memory card having a buffer memory with small capacity may need a response time ranging from tens of microseconds ($\mu$s) to hundreds of microseconds. Thus, response time with respect to a host command may increase as the buffer memory increases in capacity. Accordingly, a technology for reducing the response time with respect to the host command may be beneficial.

SUMMARY OF THE INVENTION

The present invention provides a memory controller and a memory system capable of improving a response time.

The present invention also provides a memory controller and a memory system capable of processing a host command by hardware.

In some embodiments, a memory controller for a flash memory device includes a buffer memory configured to store data to be written in the flash memory device and a buffer memory interface configured to control read and write operations of the buffer memory. Embodiments of the memory controller may also include an automatic command processing unit configured to interpret a data command generated by a host hardware device, wherein if the data command includes write information, the automatic command processing unit controls the buffer memory interface to determine whether input data is relevant to previous data stored in the buffer memory, and stores the input data consecutive to the previous data stored in the buffer memory if the input data is relevant.

In some embodiments, the automatic command processing unit includes a cache table configured to store logical address-physical address mapping information corresponding to data stored in the buffer memory. In some embodiments, the cache table is further configured to store mapping information configured to determine data relevance with respect to the previous data stored in the buffer memory. In some embodiments, the automatic command processing unit is configured to determine, responsive to the mapping information, whether input data is relevant to the previous data stored in the buffer memory.

In some embodiments, if the data command includes read information, the automatic command processing unit determines whether a logical address corresponding to address information included in the data command exists in the cache table. In some embodiments, if the logical address corresponding to the address information in the data command exists in the cache table, the automatic command processing unit controls the memory interface to output data corresponding to the logical address from the buffer memory to the outside. In some embodiments, if the logical address corresponding to the address information in the data command does not exist in the cache table, the automatic command processing unit generates an interrupt.

Some embodiments may also include a processing unit configured to operate responsive to the interrupt and a flash interface configured to control read and write operations of the flash memory device responsive to the processing unit. In some embodiments, if the interrupt is generated, the processing unit is configured to control the flash and buffer memory interfaces to transfer data corresponding to the address information from the flash memory device to the buffer memory, and to transfer data stored in the buffer memory to the host hardware device.

In some embodiments, the automatic command processing unit is configured to control the buffer memory interface not to copy new data for the buffer memory over existing data in the buffer memory responsive to empty-space information of the buffer memory.

In some embodiments, the automatic command processing unit includes a cache table configured to store logical address-physical address mapping information of the buffer memory and an empty-space table configured to store empty-space information of the buffer memory. Such embodiments may also include a command interpreter configured to interpret the data command and generate a read or write command according to an interpretation result and a buffer memory operation controller configured to control the buffer memory interface responsive to the read or write command generated by the command interpreter.

In some embodiments, the buffer memory operation controller is configured to determine a write address of the buffer memory responsive to the empty-space information of the empty-space table.

Some embodiments of the invention may also provide a memory controller for a flash memory device. A memory controller according to some embodiments includes a host interface configured to provide a communication interface between the memory controller and a host device, a flash memory interface configured to provide an communication interface between the memory controller and the flash memory device, and a processing unit configured to selectively process read and/or write operations responsive to a data command generated by the host device. Such embodiments may include a buffer memory configured to store data that is transferred between the host device and the flash memory device, an automatic command processing unit configured to process the data command received from the host via the host interface, and a buffer memory interface configured to control access to the buffer memory responsive to control signals from the processing unit and/or the automatic command processing unit.

In some embodiments, the automatic command processing unit includes a command interpreter configured to receive the data command and determine whether the data command includes a read command or a write command and a buffer memory operation controller configured to out put a physical address corresponding to a logical address and a write command to the buffer memory interface if the data command includes a write command and configured to output a physical address corresponding to a logical address and a read command to the buffer memory interface if the data command includes a read command. Such embodiments may also include a cache table configured to store logical address-physical address mapping information on data stored in the buffer memory and an empty-space table configure to store information corresponding to empty memory spaces in the buffer memory.

In some embodiments, the buffer memory operation controller is further configured to determine a write address of the buffer memory responsive to the empty-space table.

Some embodiments according to the invention may include a memory system that includes a flash memory device configured to receive and store data from a host device and a memory controller configured to process a data command generated by the host device. In some embodiments, the memory controller includes a host interface configured to provide a communication interface between the memory controller and the host device and a flash memory interface configured to provide an communication interface between the memory controller and the flash memory device. Some embodiments include a processing unit configured to selectively process read and/or write operations responsive to the data command, a buffer memory configured to store data that is transferred between the host device and the flash memory device, an automatic command processing unit configured to process the data command received from the host device via the host interface, and a buffer memory interface configured to control access to the buffer memory responsive to control signals from the processing unit and/or the automatic command processing unit.

BRIEF DESCRIPTION OF THE DRAWINGS

FIG. 3 is a view of a cache table of the memory system of FIG. 1 according to some embodiments of the invention.

FIG. 4 is a view showing a data storage state of a buffer memory according to a buffer memory write type of some embodiments of the present invention.

DETAILED DESCRIPTION OF PREFERRED EMBODIMENTS

Figure 1:
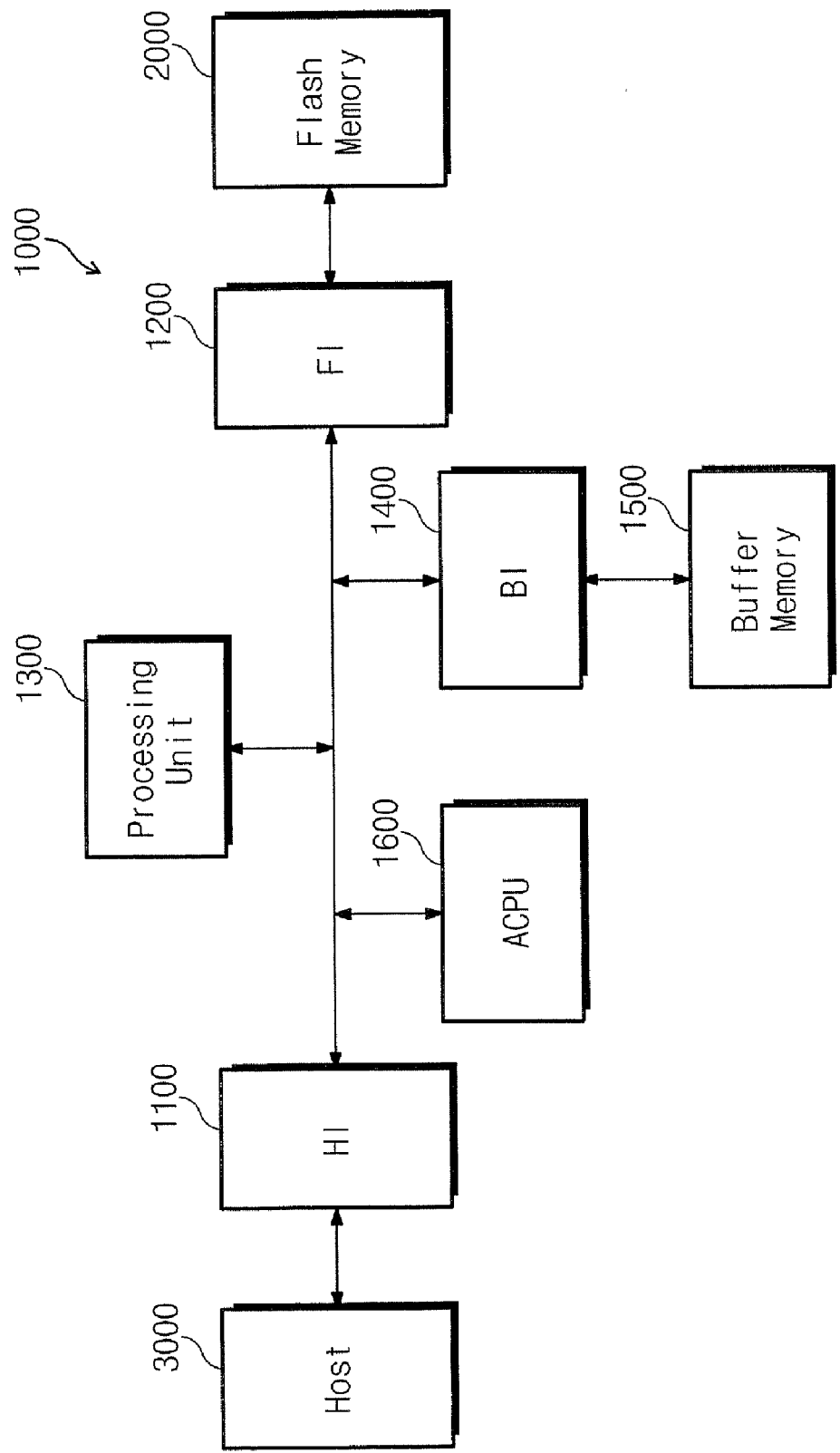
FIG. 1 is a schematic block diagram of a memory system according to some embodiments of the present invention

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art.

It will be understood that, although the terms first, second, etc. may be used herein to describe various elements, these elements should not be limited by these terms. These terms are only used to distinguish one element from another element. Thus, a first element discussed below could be termed a second element without departing from the scope of the present invention. In addition, as used herein, the singular forms "a", "an" and "the" are intended to include the plural forms as well, unless the context clearly indicates otherwise. It also will be understood that, as used herein, the term "comprising" or "comprises" is open-ended, and includes one or more stated elements, steps and/or functions without precluding one or more unstated elements, steps and/or functions. The term "and/or" includes any and all combinations of one or more of the associated listed items.

It will also be understood that when an element is referred to as being "connected" to another element, it can be directly connected to the other element or intervening elements may be present. In contrast, when an element is referred to as being "directly connected" to another element, there are no intervening elements present. It will also be understood that the sizes and relative orientations of the illustrated elements are not shown to scale, and in some instances they have been exaggerated for purposes of explanation. Like numbers refer to like elements throughout.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. The present invention will now be described more fully hereinafter with reference to the accompanying drawings, in which preferred embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art.

Below, a flash memory device, a nonvolatile memory device, is used as one example for illustrating characteristics and functions of the present invention. However, those skilled in the art can easily understand other advantages and performances of the present invention according to the descriptions. The present invention may be embodied or applied through other embodiments.

Reference is now made to FIG. 1, which is a schematic block diagram illustrating a memory system according to some embodiments of the present invention. A memory system according to the present invention includes a memory controller 1000 and a flash memory device 2000. The memory controller 1000 is configured to control the flash memory device 2000 according to a request of a host 3000. The memory controller 1000 includes a host interface 1100, a flash interface 1200, a processing unit 1300, a buffer memory interface 1400, a buffer memory 1500, and un automatic command processing unit (ACPU) 1600. The host interface 1100 provides an interface between the memory controller 1000 and the host 3000. In some embodiments, the host interface 1100 may be connected to the host 3000 by a standardized interface, including, for example, ATA, SATA, USB, SCSI, ESDI, ISO, PCI® and/or IDE interfaces. The flash interface 1200 provides an interface between the memory controller 1000 and the flash memory device 2000. In some embodiments, the flash memory device 2000 may include a nonvolatile memory device such as a NAND flash memory device, a NOR flash memory device, a PRAM, and/or a MRAM. The processing unit 1300 may be configured to selectively process read and write operations requested by the host 3000. In some embodiments, the buffer memory interface 1400 is controlled by the processing unit 1300 or the ACPU 1600 and is configured to control access to the buffer memory 1500. Exemplary flash memory devices 2000 are disclosed in U.S. Pat. Nos. 6,870,766, 6,914,013, 7,099,196, 7,042,770, and 7,110,301, which are incorporated by reference herein.

The ACPU 1600 according to some embodiments of the present invention may be configured to automatically process a data command (e.g., read/write information, a data address, and a count value representing the amount of data to be transferred) provided from the host 3000 through the host interface 1100 via hardware. If an input data command includes a write command, data transferred from the host 3000 is stored in the buffer memory 1500 through the buffer memory interface 1400 under control of the ACPU 1600. If the input data command includes a read command, data stored in the buffer memory 1500 or read from the flash memory device 200 is transferred to the host 3000 under control of the ACPU 1600 or the processing unit 1300.

The ACPU 1600 of the memory controller 1000, according to some embodiments of the present invention, may be configured to automatically process a read or write command requested by the host 3000 via hardware. Consequently, a response rate with respect to the host request may be improved.

Figure 2:
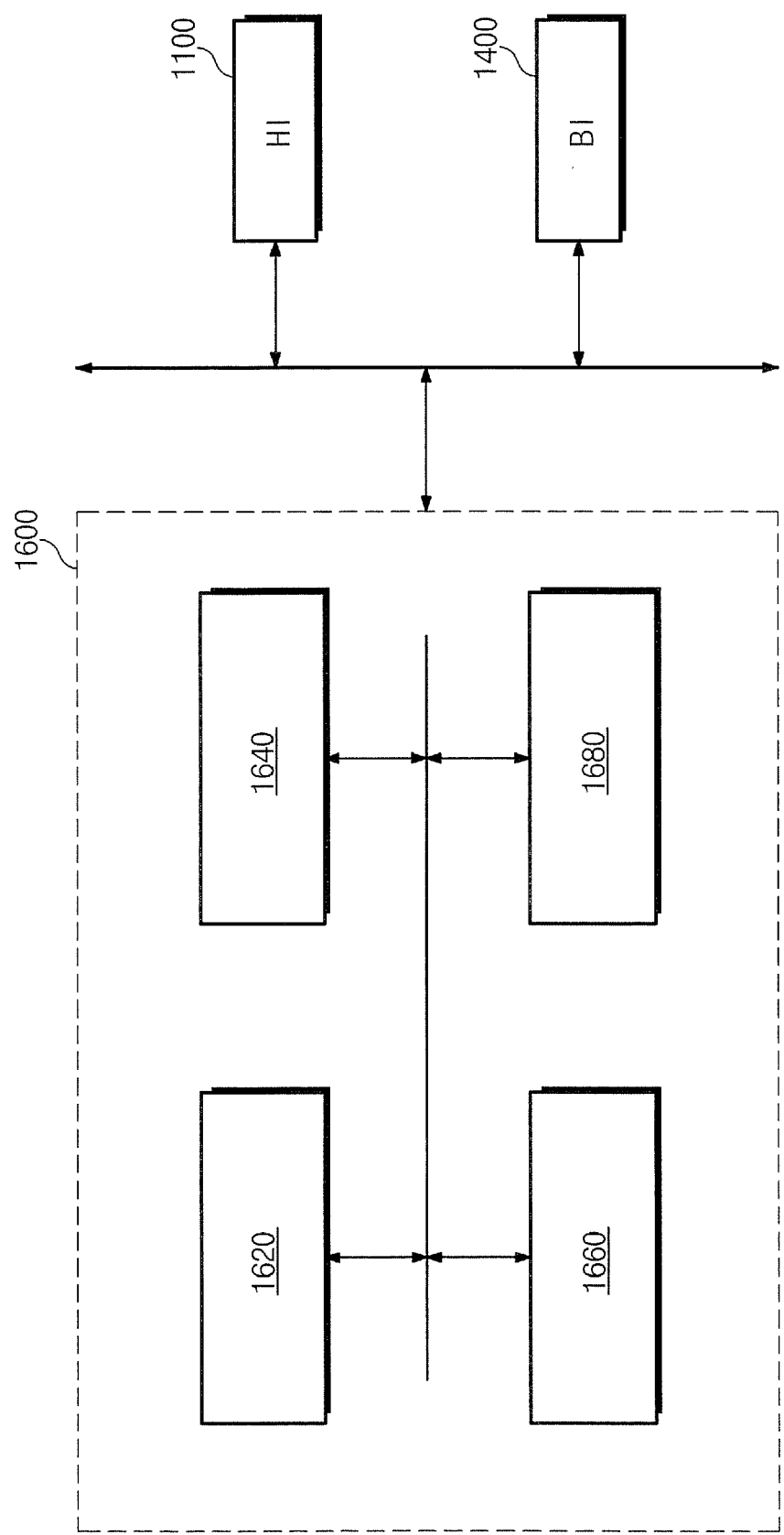
FIG. 2 is a schematic block diagram of an automatic command processing unit of the memory system of FIG. 1 according to some embodiments of the invention.

Reference is now made to FIG. 2, which is a schematic block diagram showing the automatic command processing unit (ACPU) of FIG. 1 according to some embodiments of the invention. The ACPU 1600 according to some embodiments includes a command interpreter 1620, a buffer memory operation controller 1640, a cache table 1660, and an empty-space table 1680. As illustrated in FIG. 3, which is a view of a cache table of the memory system of FIG. 1 according to some embodiments of the invention, the cache table 1660 stores logical address-physical address (LA-PA) mapping information corresponding to data stored in the buffer memory 1400. The empty-space table 1680 stores information indicating empty-spaces of the buffer memory 1400.

The command interpreter 1620 is configured to receive a data command from the host 3000 through the host interface 1100. In some embodiments, the data command is generated by the host 3000. The data command may include read/write information, a data address (i.e., logical address), and/or a count value representing the amount of data to be read/written. The command interpreter 1620 determines whether the input data command includes read information or write information. If the input data command includes the write information, the command processor 1620 determines whether the amount of data to be written is smaller than an empty space of the buffer memory 1500 with reference to information stored in the empty-space table 1680. This determination is made to reduce the possibility of a loss of data stored in the buffer memory 1500. If the input data command includes a read command, the command processor 1620 determines whether a logical address (LA) corresponding to an input data address (LA) exists in LA-PA mapping information stored in the cache table 1660. If a write command is provided from the command interpreter 1620, the buffer memory operation controller 1640 outputs a physical address (PA) corresponding to an input data address corresponding to a logical address (LA) to the buffer memory interface 1400, together with the write command. If a read command is provided from the command interpreter 1620, the buffer memory operation controller 1640 outputs a physical address (PA) corresponding to an input data address corresponding to a logical address (LA) to the buffer memory interface 1400, together with the read command. In some embodiments, the buffer memory operation controller 1640 is configured to determine a write address (i.e., physical address) of the buffer memory 1500 on the basis of the empty-space information of the empty-space table 1680.

In some embodiments, the tables 1660 and 1680 may be implemented by using one storage unit and/or using multiple corresponding storage units.

Hereinafter, an operation of the ACPU according to some embodiments of the present invention will now be described in detail with reference to accompanying drawings. An operation of the ACPU related to the write operation will be described. A data command (read/write information, a data address (LA), and a count value) transferred from the host 3000 is transferred to the command interpreter 1620 through the host interface 1100. The command interpreter 1620 determines whether the input data command includes read information or write information. If the input data command includes write information, the command interpreter 1620 determines whether the amount of data to be written is greater than an empty space with reference to the empty-space information stored in the empty-space table 1680. If it is determined that the amount of data to be written is smaller than the empty space, the command interpreter 1620 transfers a write command to the buffer memory operation controller 1640. If the write command is provided from the command interpreter 1620, the buffer memory operation controller 1640 transfers a physical address (PA) corresponding to an input logical address to the buffer memory interface 1400, together with the write command. Thereafter, the buffer memory interface 1400 stores data provided from the host 3000 in the buffer memory 1500. The LA-PA mapping information changed during the write operation is stored in the cache table 1660. If it is determined that the amount of data to be written is greater than the empty space, an interrupt may be generated after a data transfer limited to the size of the empty space is started. In some embodiments, the interrupt may be generated in a state where the data transfer is not made at all. When the interrupt is generated, the processing unit 1300 is configured to ensure an empty space and the remaining data transfer may be started.

Data to be stored in the buffer memory 1500 during the write operation may be consecutively and/or non-consecutively managed depending on the relevance to previous data. The data to be stored in the buffer memory 1500 may be consecutively stored on the basis of the relevance to the previous data.

When the input data command includes write information, the command interpreter 1620 transfers a write command to the buffer memory operation controller 1640. In response to the write command, the buffer memory operation controller 1640 is configured to determine whether or not data of a data address (LA) is consecutive to previous data stored in the buffer memory 1500. If the data has consecutiveness or relevance, the buffer memory operation controller 1640 determines a physical address (PA) corresponding to the data address (LA) input. Input data is relevant to previous data if the input data is related to the previous data stored. For example, relevant data might be a subsequent portion of the same file and/or group of files previously stored in the buffer memory. In some embodiments, relevance corresponds to consecutiveness of data in storage and/or transmission. In this manner, the data may be stored consecutively relative to the previous data stored in the buffer memory 1500. The physical address determined in such a manner is transferred to the buffer memory interface 1400, together with the write command. If data of the data address (LA) is not consecutive or relevant to the previous data stored in the buffer memory 1500, the buffer memory operation controller 1640 randomly determines a physical address such that data transferred from the host 3000 is stored in an independent address space of the buffer memory 1500. The physical address determined in such a manner is transferred to the buffer memory interface 1400, together with the write command. Consequently, as illustrated in FIG. 4, data having consecutiveness or relevance is consecutively stored in the buffer memory 1500, while data having no consecutiveness or relevance is non-consecutively stored in the buffer memory 1500. In this manner, the data that is consecutively stored in the buffer memory 1500 may be stored in the same region of the flash memory device 2000 at the same time. Hence, the write performance may be improved.

Regarding the operation of the ACPU related to the read operation, a data command (read/write information, a data address (LA), and a count value) transferred from the host 3000 is transferred to the command interpreter 1620 through the host interface 1100. The command interpreter 1620 determines whether or not the input data command includes read information or write information. If the input data command includes read information, the command processor 1620 determines whether a logical address (LA) corresponding to an input data address (LA) exists in the LA-PA mapping information stored in the cache table 1660. If the logical address (LA) corresponding to the input data address (LA) exists in the LA-PA mapping information stored in the cache table 1660, the command interpreter 1620 transfers a read command to the buffer memory operation controller 1640. If the read command is provided from the command interpreter 1620, the buffer memory operation controller 1640 transfers a physical address corresponding to the input data address to the buffer memory interface 1400, together with the read command. Thereafter, the buffer memory interface 1400 controls the buffer memory 1500 to read data in response to the read command and the physical address, and the read data is transferred to the host 3000 through the host interface.

If the logical address (LA) corresponding to the input data address (LA) does not exist in the LA-PA mapping information stored in the cache table 1660, the ACPU 1600, via either the command interpreter or the buffer memory operation controller, generates an interrupt. When the interrupt is generated from the ACPU 1600, the processing unit 1300 controls the flash interface 1200 responsive to the input data command that is stored in a register (not shown) of the host interface 1100. Additionally, the processing unit 1300 may provide control signals to the flash interface 1200 to control the read operation of the flash memory device 2000. Thereafter, data read from the flash memory device 2000 may be stored in the buffer memory 1500 via the flash interface 1200 and the buffer memory interface 1400. Data stored in the buffer memory 1500 may then be transferred to the host 3000 via the host interface 1100 and the buffer memory interface 1400.

The memory controller and the flash memory device according to some embodiments of the present invention may be a flash memory card. However, the present invention is not limited to a flash memory card. For example, the memory controller according to some embodiments of the present invention may be mounted on a main board of a personal computer (PC) and/or other computing and/or data processing device. For example, a flash memory device may be connected to a computer in the form of card and/or USB connected device.

As discussed above, since a read/write command requested by the host may be automatically processed by hardware, a response time with respect to the host request can be reduced. Also, the write operation of the buffer memory may be controlled depending on consecutiveness and/or relevance of data to be stored in the buffer. In this manner, write performance of the memory controller may be improved.

Although the present invention has been described in terms of specific embodiments, the present invention is not intended to be limited by the embodiments described herein. Thus, the scope may be determined by the following claims.

What is claimed is:

1. A memory controller for a flash memory device that includes a flash memory, the memory controller comprising:
    a buffer memory configured to store data to be written in the flash memory device;
    a buffer memory interface configured to control read and write operations of the buffer memory; and
    an automatic command processing unit configured to receive a data command generated by a host hardware device,
    wherein the data command includes write information,
    wherein the automatic command processing unit controls the buffer memory interface to determine that input data that is not previously stored in the buffer memory and that is to be written in the flash memory is consecutive to previous data stored in the buffer memory and that is to be written in the flash memory and stores the input data that is to be written in the flash memory consecutive to the previous data that is to be written in the flash memory that is stored in the buffer memory,
    wherein the automatic command processing unit controls the buffer memory interface to determine, responsive to receipt of input data, that input data that is to be written in the flash memory is not consecutive to previous data that is to be written in the flash memory and that is stored in the buffer memory and stores the input data that is to be written in the flash memory in a random location in the buffer memory,
    wherein the automatic command processing unit comprises a cache table configured to store logical address-physical address mapping information corresponding to data stored in the buffer memory; and
    wherein the automatic command processing unit is configured to determine, responsive to the mapping information, whether input data is consecutive to the previous data stored in the buffer memory.

2. The memory controller of claim 1, wherein the cache table is further configured to store mapping information configured to determine data relevance with respect to the previous data stored in the buffer memory.

3. The memory controller of claim 1, wherein if the data command includes read information, the automatic command processing unit determines whether a logical address corresponding to address information included in the data command exists in the cache table.

4. The memory controller of claim 3, wherein if the logical address corresponding to the address information in the data command exists in the cache table, the automatic command processing unit controls the memory interface to output data corresponding to the logical address from the buffer memory to the outside.

5. The memory controller of claim 4, wherein if the logical address corresponding to the address information in the data command does not exist in the cache table, the automatic command processing unit generates an interrupt.

6. The memory controller of claim 5, further comprising:
   a processing unit configured to operate responsive to the interrupt; and
   a flash interface configured to control read and write operations of the flash memory device responsive to the processing unit.

7. The memory controller of claim 6, wherein if the interrupt is generated, the processing unit is configured to control the flash and buffer memory interfaces to transfer data corresponding to the address information from the flash memory device to the buffer memory, and to transfer data stored in the buffer memory to the host hardware device.

8. The memory controller of claim 1, wherein the automatic command processing unit is configured to control the buffer memory interface not to copy new data for the buffer memory over existing data in the buffer memory responsive to empty-space information of the buffer memory.

9. The memory controller of claim 1, wherein the automatic command processing unit comprises:
   a cache table configured to store logical address-physical address mapping information of the buffer memory;
   an empty-space table configured to store empty-space information of the buffer memory;
   a command interpreter configured to interpret the data command and generate a read or write command according to an interpretation result; and
   a buffer memory operation controller configured to control the buffer memory interface responsive to the read or write command generated by the command interpreter.

10. The memory controller of claim 9, wherein the buffer memory operation controller is configured to determine a write address of the buffer memory responsive to the empty-space information of the empty-space table.

11. The memory controller of claim 1, wherein input data that is consecutive to previous data comprises input data that is a subsequent portion of a file and/or group of files that includes the previous data.

12. The memory controller of claim 1, wherein input data that is consecutive to previous data comprises input data that is consecutive to previous data an transmission and/or storage.

13. A memory controller for a flash memory device, the memory controller comprising:
   a host interface configured to provide a communication interface between the memory controller and a host device;
   a flash memory interface configured to provide an communication interface between the memory controller and the flash memory device;
   a processing unit configured to selectively process read and/or write operations responsive to a data command generated by the host device;
   a buffer memory configured to store data that is transferred between the host device and the flash memory device;
   an automatic command processing unit configured to process the data command received from the host via the host interface; and
   a buffer memory interface configured to control access to the buffer memory responsive to control signals from the processing unit and/or the automatic command processing unit,
   wherein the automatic command processing unit controls the buffer memory interface to determine that input data that is to be written in the flash memory and that is not previously stored in the buffer memory is consecutive to previous data that is to be written in the flash memory and that is stored in the buffer memory and stores the input data that is to be written in the flash memory consecutive to the previous data that is to be written in the flash memory and stored in the buffer memory,
   wherein the automatic command processing unit controls the buffer memory interface to determine, responsive to receipt of input data, that input data that is to be written in the flash memory and that is not consecutive to previous data that is to be written in the flash memory and that is stored in the buffer memory and stores the input data that is to be written in the flash memory in a random location in the buffer memory,
   wherein the automatic command processing unit comprises a cache table configured to store logical address-physical address mapping information corresponding to data stored in the buffer memory, and
   wherein the automatic command processing unit is configured to determine, responsive to the mapping information, whether input data is consecutive to the previous data stored in the buffer memory.

14. The memory controller of claim 13, wherein the automatic command processing unit comprises:
   a command interpreter configured to receive the data command and determine whether the data command includes a read command or a write command;
   a buffer memory operation controller configured to output a physical address corresponding to a logical address and a write command to the buffer memory interface if the data command includes a write command and configured to output a physical address corresponding to a logical address and a read command to the buffer memory interface if the data command includes a read command; and
   an empty-space table configure to store information corresponding to empty memory spaces in the buffer memory.

15. The memory controller of claim 14, wherein the buffer memory operation controller is further configured to determine a write address of the buffer memory responsive to the empty-space table.

16. A memory system comprising: a flash memory device configured to receive and store data from a host device; and
   a memory controller configured to process a data command generated by the host device, the memory controller comprising:
   a host interface configured to provide a communication interface between the memory controller and the host device;
   a flash memory interface configured to provide an communication interface between the memory controller and the flash memory device;
   a processing unit configured to selectively process read and/or write operations responsive to the data command;
   a buffer memory configured to store data that is transferred between the host device and the flash memory device;
   an automatic command processing unit configured to process the data command received from the host device via the host interface; and a buffer memory interface configured to control access to the buffer memory responsive to control signals from the processing unit and/or the automatic command processing unit, wherein the automatic command processing unit controls the buffer memory interface to determine that input data that is to be written in the flash memory and that is not previously stored in the buffer memory is consecutive to previous data that is to be written in the flash memory and that is stored in the buffer memory and stores the input data that is to be written in the flash memory consecutive to the previous data that is to be written in the flash memory and that is stored in the buffer memory, wherein the automatic command processing unit controls the buffer memory interface to determine, responsive to receipt of input data, that input data that is to be written in the flash memory and that is not consecutive to previous data that is to be written in the flash memory and that is stored in the buffer memory and stores the input data that is to be written in the flash memory in a random location in the buffer memory, wherein the automatic command processing unit comprises a cache table configured to store logical address-physical address mapping information corresponding to data stored in the buffer memory, and wherein the automatic command processing unit is configured to determine, responsive to the mapping information, whether input data is consecutive to the previous data stored in the buffer memory.

* * * * *